United States Patent
Jeon et al.

(10) Patent No.: US 12,507,256 B2
(45) Date of Patent: Dec. 23, 2025

(54) METHOD AND APPARATUS FOR MONITORING OPERATION STATE INDICATION

(71) Applicant: Samsung Electronics Co., Ltd., Suwon-si (KR)

(72) Inventors: Jeongho Jeon, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 18/354,522

(22) Filed: Jul. 18, 2023

(65) Prior Publication Data

US 2024/0040586 A1    Feb. 1, 2024

Related U.S. Application Data

(60) Provisional application No. 63/394,179, filed on Aug. 1, 2022.

(51) Int. Cl.
*H04W 72/23* (2023.01)
*H04W 72/04* (2023.01)
(Continued)

(52) U.S. Cl.
CPC ......... *H04W 72/232* (2023.01); *H04W 72/04* (2013.01)

(58) Field of Classification Search
CPC . H04W 72/23; H04W 72/0446; H04W 72/21; H04W 24/08; H04W 24/10;
(Continued)

(56) References Cited

U.S. PATENT DOCUMENTS

| | | | |
|---|---|---|---|
| 2013/0235821 A1* | 9/2013 | Chen | H04L 1/1861 370/328 |
| 2015/0282134 A1* | 10/2015 | Suzuki | H04L 27/2662 370/329 |

(Continued)

FOREIGN PATENT DOCUMENTS

| WO | 2020146499 A1 | 7/2020 |
|---|---|---|
| WO | 2021041833 A1 | 3/2021 |
| WO | 2021146849 A1 | 7/2021 |

OTHER PUBLICATIONS

"3rd Generation Partnership Project; Technical Specification Group Radio Access Network; NR; Physical channels and modulation (Release 17)", 3GPP TS 38.211 V17.2.0, Jun. 2022, 136 pages.

(Continued)

*Primary Examiner* — Sai Aung

(57) ABSTRACT

Methods and apparatuses for monitoring an indication of an operation state on a cell in a wireless communication system. A method for a user equipment (UE) includes receiving first information related to a list of parameters in one or more domains; receiving second information for a search space set for reception of physical downlink control channel (PDCCHs); and receiving a PDCCH from the PDCCHs. The list includes a number of sets of parameters corresponding to a first number of cells. The PDCCH provides a downlink control information (DCI) format that indicates a number of indexes. An index from the number of indexes is associated with a second number of cells from the first number of cells. The method further includes determining parameters on a cell from the second number of cells based on the index and receiving a channel or signal on the cell based on the parameters.

20 Claims, 9 Drawing Sheets

(51) Int. Cl.
  *H04W 72/12* (2023.01)
  *H04W 72/232* (2023.01)
(58) Field of Classification Search
  CPC ... H04W 76/11; H04W 88/08; H04W 72/232; H04W 76/15; H04W 72/126
  See application file for complete search history.

(56) References Cited

U.S. PATENT DOCUMENTS

| | | | | |
|---|---|---|---|---|
| 2020/0112897 | A1 | 4/2020 | Jung et al. | |
| 2020/0322109 | A1* | 10/2020 | Yu | H04B 7/022 |
| 2021/0037551 | A1* | 2/2021 | Khoshnevisan | H04L 5/0044 |
| 2022/0110128 | A1 | 4/2022 | Takahashi et al. | |
| 2022/0159574 | A1 | 5/2022 | Islam et al. | |
| 2022/0408458 | A1* | 12/2022 | MolavianJazi | H04W 72/0453 |
| 2022/0408464 | A1* | 12/2022 | MolavianJazi | H04W 72/0453 |
| 2022/0417909 | A1* | 12/2022 | Zhu | H04L 5/005 |
| 2023/0125672 | A1* | 4/2023 | Grossmann | H04L 5/0094 |
| 2023/0254088 | A1* | 8/2023 | Ly | H04W 76/28 370/329 |
| 2023/0254770 | A1* | 8/2023 | Ly | H04W 72/23 370/318 |
| 2023/0284205 | A1* | 9/2023 | Nory | H04W 72/232 370/329 |
| 2023/0389018 | A1* | 11/2023 | Nimbalker | H04W 72/232 |

OTHER PUBLICATIONS

"3rd Generation Partnership Project; Technical Specification Group Radio Access Network; NR; Multiplexing and channel coding (Release 17)", 3GPP TS 38.212 V17.2.0, Jun. 2022, 201 pages.

"3rd Generation Partnership Project; Technical Specification Group Radio Access Network; NR; Physical layer procedures for control (Release 17)", 3GPP TS 38.213 V17.2.0, Jun. 2022, 256 pages.

"3rd Generation Partnership Project; Technical Specification Group Radio Access Network; NR; Physical layer procedures for data (Release 17)," 3GPP TS 38.214 V17.2.0 , Jun. 2022, 228 pages.

"5G; NR; Medium Access Control (MAC) protocol specification (3GPP TS 38.321 version 17.1.0 Release 17)", ETSI TS 138 321 V17.1.0 , Aug. 2022, 244 pages.

"5G; NR; Radio Resource Control (RRC); Protocol specification (3GPP TS 38.331 version 17.1.0 Release 17)", ETSI TS 138 331 V17.1.0, Aug. 2022, 1257 pages.

International Search Report and Written Opinion issued Nov. 15, 2023 regarding International Application No. PCT/KR2023/011141, 6 pages.

Moderator (CMCC), "Summary#6 on mechanisms to support group scheduling for RRC_Connected UEs for NR MBS", 3GPP TSG RAN WG1 #108-e. R1-2202642, Feb. 2022, 175 pages.

Extended European Search Report issued Oct. 20, 2025 regarding Application No. 23850372.6, 11 pages.

* cited by examiner

METHOD AND APPARATUS FOR MONITORING OPERATION STATE INDICATION

CROSS-REFERENCE TO RELATED APPLICATIONS AND CLAIM OF PRIORITY

The present application claims priority to U.S. Provisional Patent Application No. 63/394,179, filed on Aug. 1, 2023. The contents of the above-identified patent documents are incorporated herein by reference.

TECHNICAL FIELD

The present disclosure relates generally to wireless communication systems and, more specifically, the present disclosure relates to monitoring an indication of an operation state on a cell in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a monitoring an indication of operation state on a cell in a wireless communication system.

In one embodiment, a method for a user equipment (UE) is provided. The method includes receiving first information related to a list of parameters in one or more of power, spatial, time, or frequency domains; receiving second information for a search space set for reception of physical downlink control channel (PDCCHs); and receiving a PDCCH from the PDCCHs. The list includes a number of sets of parameters corresponding to a first number of cells. The sets of parameters are associated with transmission of channels or signals from a base station. The PDCCH provides a downlink control information (DCI) format that indicates a number of indexes. An index from the number of indexes is associated with a second number of cells from the first number of cells. The index corresponds to a set of parameters from the number of sets of parameters that corresponds to the second number of cells. The method further includes determining parameters on a cell from the second number of cells based on the index and receiving a channel or signal on the cell based on the parameters.

In another embodiment, a UE is provided. The UE includes a transceiver configured to receive first information related to a list of parameters in one or more of power, spatial, time, or frequency domains; second information for a search space set for reception of PDCCHs; and a PDCCH from the PDCCHs. The list includes a number of sets of parameters corresponding to a first number of cells. The sets of parameters are associated with transmission of channels or signals from a base station. The PDCCH provides a DCI format that indicates a number of indexes. An index from the number of indexes is associated with a second number of cells from the first number of cells. The index corresponds to a set of parameters from the number of sets of parameters. The UE further includes a processor operably coupled to the transceiver. The processor is configured to determine parameters for receptions on a cell from the second number of cells based on the index. The transceiver is further configured to receive a channel or signal on the cell based on the parameters.

In yet another embodiment, a base station is provided. The base station includes a transceiver configured to transmit first information related to a list of parameters in one or more of power, spatial, time, or frequency domains; second information for a search space set for transmission of PDCCHs; and a PDCCH from the PDCCHs. The list includes a number of sets of parameters corresponding to a first number of cells. The sets of parameters are associated with transmission of channels or signals from a base station. The PDCCH provides a DCI format that indicates a number of indexes. An index from the number of indexes is associated with a second number of cells from the first number of cells. The index corresponds to a set of parameters from the number of sets of parameters that corresponds to the second number of cells. The base station further includes a processor operably coupled to the transceiver. The processor is configured to determine parameters for transmissions on a cell from the second number of cells based on the index. The transceiver is further configured to transmit a channel or a signal on the cell based on the parameters.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v17.2.0, "NR; Physical channels and modulation"; 3GPP TS 38.212 v17.2.0, "NR; Multiplexing and Channel coding"; 3GPP TS 38.213 v17.2.0, "NR; Physical Layer Procedures for Control"; 3GPP TS 38.214 v17.2.0, "NR; Physical Layer Procedures for Data"; 3GPP TS 38.321 v17.1.0, "NR; Medium Access Control (MAC) protocol specification" and 3GPP TS 38.331 v17.1.0, "NR; Radio Resource Control (RRC) Protocol Specification."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
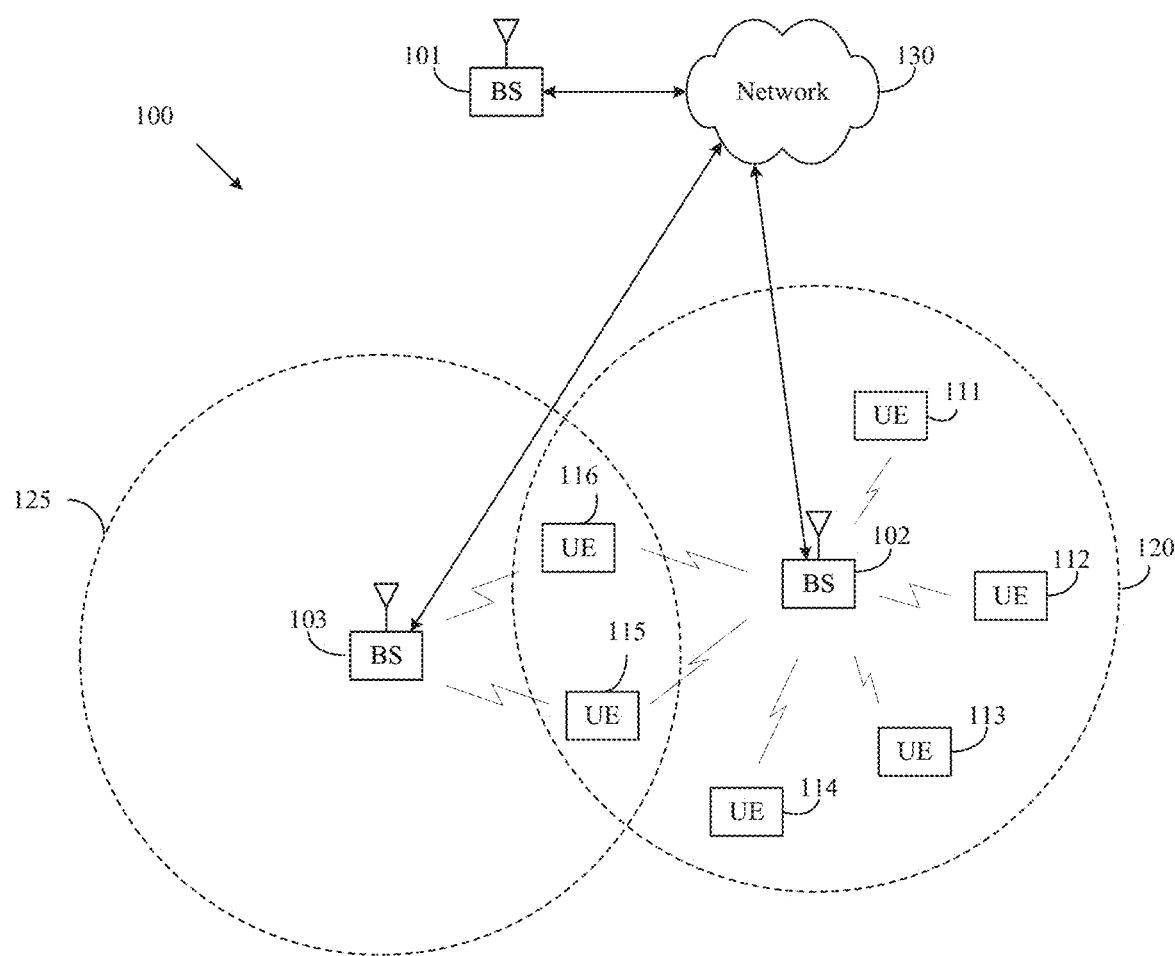
FIG. 1 illustrates an example of wireless network according to embodiments of the present disclosure.
Figure 2:
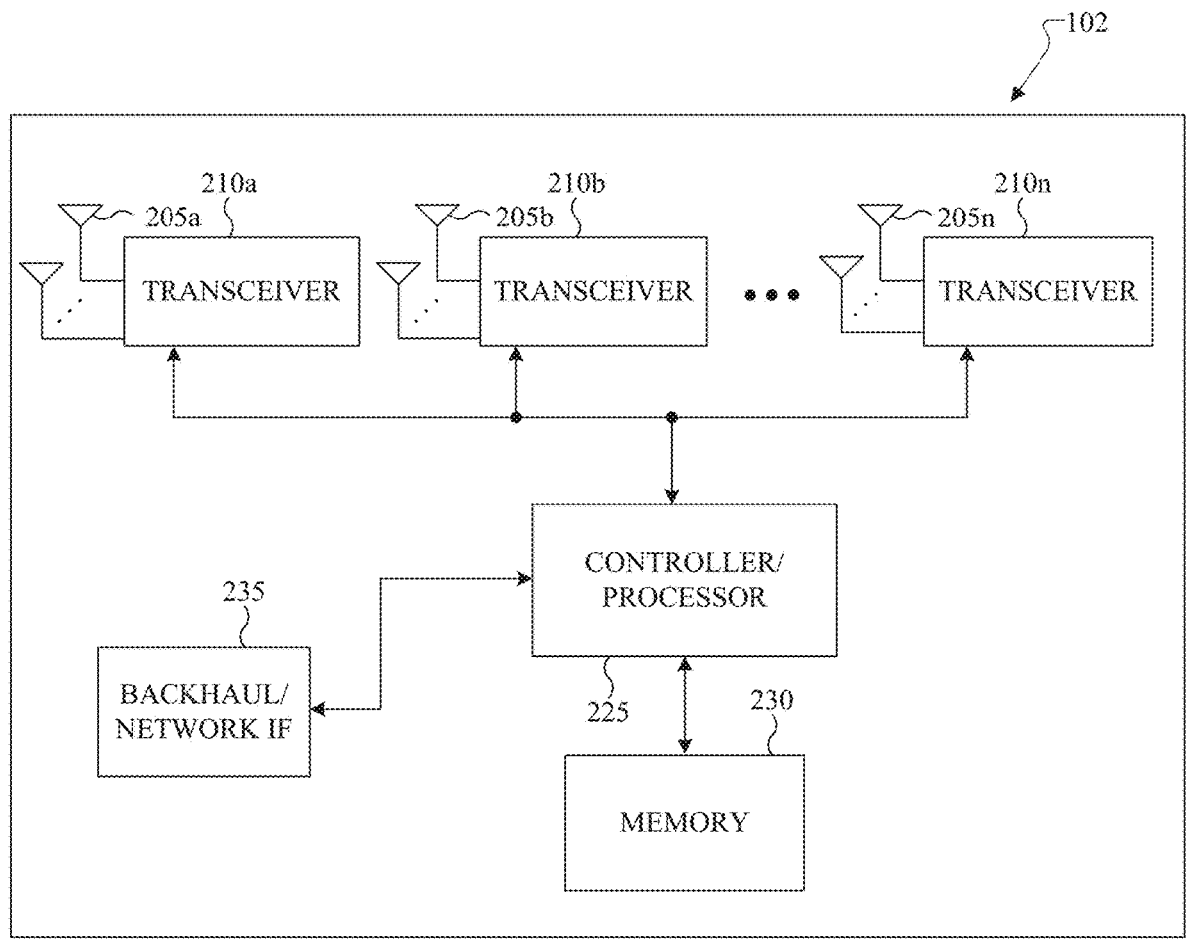
FIG. 2 illustrates an example of gNB according to embodiments of the present disclosure.
Figure 3:
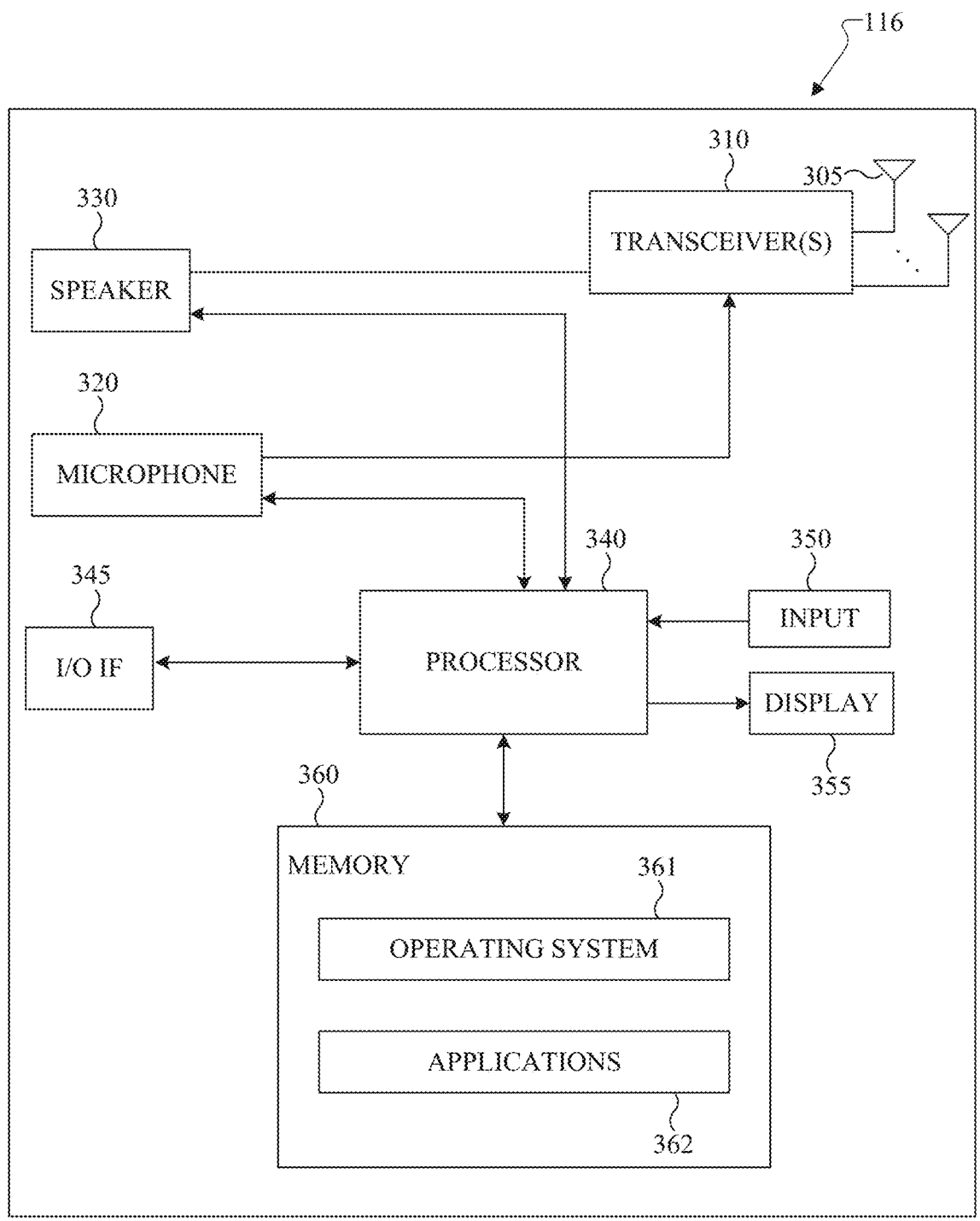
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a monitoring an indication of an operation state on a cell in a wireless communication system. In certain embodiments, and one or more of the gNBs 101-103 includes circuitry, programing, or a combination thereof, to support monitoring an indication of an operation state on a cell in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes to support monitoring an indication of an operation state on a cell in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for monitoring an indication of an operation state on a cell in a wireless communication system.

The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355m which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
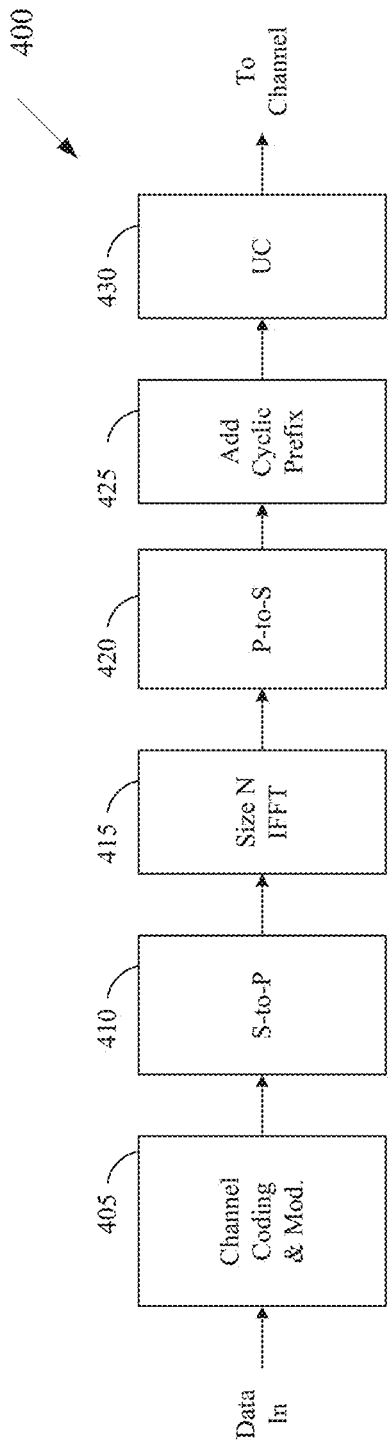
FIGS. 4 and 5 illustrate example of wireless transmit and receive paths according to this disclosure.
Figure 5:
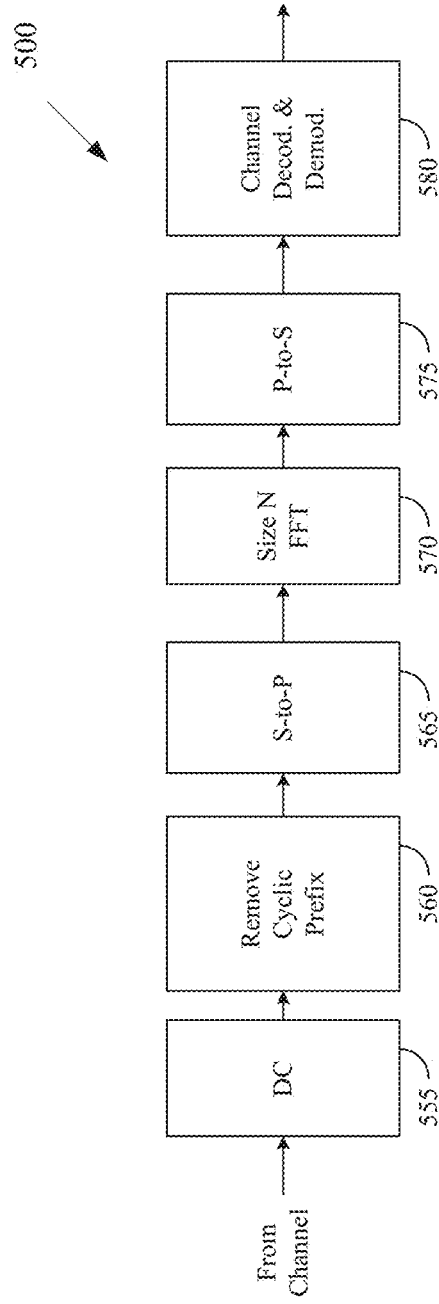

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support monitoring an operation state indication in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 downconverts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

For each DL bandwidth part (BWP) indicated to a UE in a serving cell, the UE can be provided by higher layer signaling with P≤3 control resource sets (CORESETs). For each CORESET, the UE is provided a CORESET index p, 0≤p<12, a demodulation reference signal (DM-RS) scrambling sequence initialization value, a precoder granularity for a number of resource element groups (REGs) in the frequency domain where the UE can assume use of a same DM-RS precoder, a number of consecutive symbols for the CORESET, a set of resource blocks (RBs) for the CORESET, control channel element (CCE)-to-REG mapping parameters, an antenna port quasi co-location, from a set of antenna port quasi co-locations, indicating quasi co-location information of the DM-RS antenna port for PDCCH reception in a respective CORESET, and an indication for a presence or absence of a transmission configuration indication (TCI) field for DCI format 1_1 transmitted by a PDCCH in CORESET p.

For each DL BWP configured to a UE in a serving cell, the UE is provided by higher layers with S≤10 search space sets. For each search space set from the S search space sets, the UE is provided a search space set index s, 0≤s<40, an association between the search space set s and a CORESET p, a PDCCH monitoring periodicity of $k_s$ slots and a PDCCH monitoring offset of $o_s$ slots, a PDCCH monitoring pattern within a slot, indicating first symbol(s) of the CORESET within a slot for PDCCH monitoring, a duration of $T_s < k_s$ slots indicating a number of slots that the search space set s exists, a number of PDCCH candidates $M_s^{(L)}$ per CCE aggregation level L, and an indication that search space set s is either a CSS set or a USS set. When search space set s is a CSS set, the UE monitors PDCCH for detection of DCI format 2_x, where x ranges from 0 to 7 as described in TS 38.212, or for DCI formats associated with scheduling broadcast/multicast physical downlink shared channel (PDSCH) receptions, and possibly for DCI format 0_0 and DCI format 1_0.

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $n_{s,f}^\mu$ in a frame with number $n_f$ if $(n_f \cdot N_{slot}^{frame,\mu} + n_{s,f}^\mu - o_s) \bmod k_s = 0$. The UE monitors PDCCH candidates for search space set s for $T_s$ consecutive slots, starting from slot $n_{s,f}^\mu$, and does not monitor PDCCH candidates for search space set s for the next $k_s - T_s$ consecutive slots. The UE determines CCEs for monitoring PDCCH according to a search space set based on a search space equation as described in TS 38.213.

A UE is expected to monitor PDCCH candidates for up to 4 sizes of DCI formats that include up to 3 sizes of DCI formats with a cyclic redundancy check (CRC) scrambled by a cell radio network temporary identifier (C-RNTI) per serving cell. The UE counts a number of sizes for DCI formats per serving/scheduled cell based on a number of PDCCH candidates in respective search space sets for the corresponding active DL BWP. In the present disclosure, a constraint for the number of DCI format sizes will be referred to as DCI size limit. When the DCI size limit may be exceeded for a UE based on a configuration of DCI formats that the UE monitors PDCCH, the UE aligns the size of some DCI formats, as described in TS 38.212, so that the DCI size limit may not be exceeded.

For each scheduled cell, the UE is not required to monitor on the active DL BWP with a subcarrier spacing (SCS) configuration μ of the scheduling cell more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped control channel elements (CCEs) per slot, wherein $M_{PDCCH}^{max,slot,\mu}$ and $C_{PDCCH}^{max,slot,\mu}$ are respectively a maximum number of PDCCH candidates and non-overlapping CCEs for a scheduled cell and $M_{PDCCH}^{total,slot,\mu}$ and $C_{PDCCH}^{total,slot,\mu}$ are respectively a total number of PDCCH candidates and non-overlapping CCEs for a scheduling cell, as described in TS 38.213.

A UE may be not expected to be configured CSS sets, other than CSS sets for multicast PDSCH scheduling, that result to corresponding total, or per scheduled cell, numbers of monitored PDCCH candidates and non-overlapped CCEs per slot on the primary cell that exceed the corresponding maximum numbers per slot. For USS sets or for CSS sets associated with multicast PDSCH scheduling, when a number of PDCCH candidates or non-overlapping CCEs in a slot may exceed the aforementioned limits/maximum per slot for scheduling on the primary cell, the UE selects the USS sets or the CSS sets to monitor corresponding PDCCH in an ascending order of a corresponding search space set index until and an index of a search space set for which PDCCH monitoring may result to exceeding the maximum number of PDCCH candidates or non-overlapping CCEs per slot for scheduling on the PCell as described in TS 38.213.

For a same cell scheduling or for a cross-carrier scheduling where a scheduling cell and scheduled cells have DL BWPs with same SCS configuration y, a UE does not expect a number of PDCCH candidates, and a number of corresponding non-overlapped CCEs per slot on a secondary cell to be larger than the corresponding numbers that the UE is capable of monitoring on the secondary cell per slot. For a cross-carrier scheduling, the number of PDCCH candidates for monitoring and the number of non-overlapped CCEs per slot are separately counted for each scheduled cell.

A UE can be configured for an operation with carrier aggregation (CA) for PDSCH receptions over multiple cells (DL CA) or for PUSCH transmissions over multiple cells (UL CA). The UE can also be configured multiple transmission-reception points (TRPs) per cell via indication (or absence of indication) of a coresetPoolIndex for CORESETs where the UE receives PDCCH/PDSCH from a corresponding TRP as described in TS 38.213 and TS 38.214.

Present networks have limited capability to adapt an operation state in one or more of time/frequency/spatial/power domains. For example, in NR, there are transmissions or receptions by a serving gNB that are expected by UEs, such as transmissions of synchronization signal/physical broadcast channel (SS/PBCH) blocks or system information or of channel state information reference signal (CSI-RS) indicated by higher layers, or receptions of physical random access channel (PRACH) or sounding reference signal (SRS) indicated by higher layers. Reconfiguration of a NW operation state involves higher layer signaling by a system information block (SIB) or by UE-specific RRC. That is a slow process and requires substantial signaling overhead, particularly for UE-specific RRC signaling.

For example, it is currently not practical or possible for a network in typical deployments to enter an energy saving state where the network does not transmit or receive due to low traffic as, in order to obtain material energy savings, the network needs to suspend transmissions or receptions for several tens of milliseconds and preferably for even longer time periods. A similar inability exists for suspending transmission or receptions for shorter time periods as a serving gNB may need to transmit SS/PBCH blocks every 5 msec and, in time division duplex (TDD) systems with UL-DL configurations having few UL symbols in a period, the serving gNB may need to receive PRACH or SRS in most UL symbols in a period.

Due to the above reasons, adaptation of a NW operation state is typically over long time periods, such as for off-peak hours when an amount of served traffic is small and for peak hours when an amount of served traffic is large. Therefore, a capability of a gNB to improve service by fast adaptation of a NW operation state to the traffic types and load, or to save energy by switching to a state that requires less energy consumption when an impact on service quality may be limited or none, is currently limited as there are no procedures for a serving gNB to perform fast adaptation of a NW operation state, with small signaling overhead, while simultaneously informing all UEs.

It is also beneficial to support a gradual transition of NW operation states between a maximum state where the NW operates at its maximum capability in one or more of a time/frequency/spatial/power domain and a minimum state where the NW operates at its minimum capability, or the NW enters a sleep mode. That may allow continuation of service while the NW transitions from a state with larger utilization of time/frequency/spatial/power resources to a state with lower utilization of such resources and the reverse as UEs can obtain time/frequency synchronization and AGC alignments, perform measurements and provide CSI reports or transmit SRS prior to scheduling of PDSCH receptions or PUSCH transmissions.

Fast information exchange between a serving gNB and UEs can be achieved by a physical layer signaling and, when a group of UEs or all UEs need to be informed, that physical layer signaling can be provided by control information that is commonly received by the UEs. Therefore, a serving gNB can utilize a PDCCH transmission to provide a DCI format with information about an adaptation of a NW operation state.

For example, in present deployments, such a DCI format is a DCI format 2_0 with information that adapts a TDD UL-DL configuration as described in TS 38.213, or a DCI format 2_1, 2_2, 2_3, 2_4, 2_6, and 2_7 with information that adapts UE transmissions or receptions as described in TS 38.213. As a UE can be configured for operation over multiple cells, such as for operation with carrier aggregation or dual connectivity, it is beneficial that a DCI format indicates NW operation states for multiple cells.

It may not be always possible for a NW to transmit PDCCHs providing a DCI format indicating NW operation states according to corresponding search space sets, for example when the NW is in a sleep state or transitions to a sleep state. To support such operation, it is beneficial for the DCI format to also indicate to UEs a next monitoring occasion for PDCCHs providing the DCI format indicating NW operation states.

There can also be cases where a UE cannot monitor PDCCH for detection of a DCI format indicating NW operation states, particularly when a periodicity of such PDCCH monitoring is long, and it may be then beneficial for a NW to also indicate NW operation states by a DCI format that a UE monitors corresponding PDCCHs according to USS sets.

Therefore, there is a need to define functionalities and procedures for adaptation of NW operation states.

There is another need to indicate NW operation states for multiple cells by a same DCI format.

There is another need to enable a UE to receive a PDCCH providing a DCI format that indicates adaptation of NW operation states.

There is another need to indicate NW operation states using a DCI format provided by PDCCH receptions according to USS sets.

Finally, there is a need to enable introduction of a DCI format that indicates adaptation of NW operation states under a present restriction on a number of sizes of DCI formats that a UE can support while minimizing or avoiding an increase in size of other DCI formats that a UE monitors corresponding PDCCH.

A NW operation state includes one or more operation states on respective one or more groups of cells of the NW. A group of cells includes one or more cells.

The general principle for adaptation of NW operation states by physical layer signaling includes a serving gNB indicating to a UE a set of NW operation states by higher layer signaling, such as by a SIB or UE-specific RRC signaling, and transmitting a PDCCH that provides a DCI format (DCI format 2_8) indicating an index to the set of NW operation states for the UE to determine an update of NW operation states.

Figure 6:
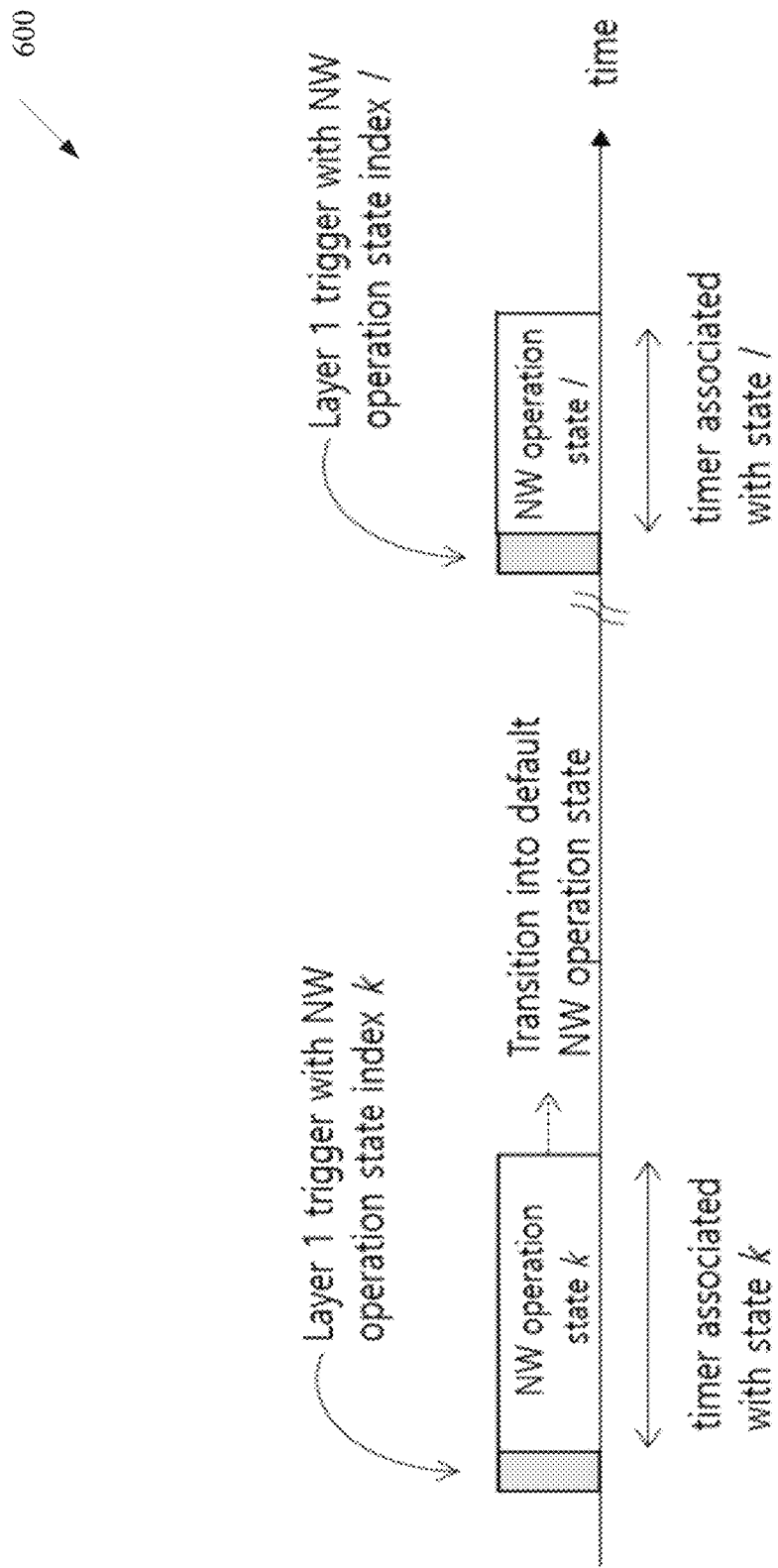
FIG. 6 illustrates example of timing diagram of a network (NW) operation state transition according to this disclosure.

FIG. 6 illustrates example of timing diagram of NW operation state transition 600 according to this disclosure. An embodiment of the timing diagram of NW operation state transition 600 shown in FIG. 6 is for illustration only.

FIG. 6 illustrates an example procedure for a NW operation state transition among different NW operation states according to the disclosure.

A NW transitions from a first NW operation state, denoted as state k, to a second NW operation state, denoted as state 1. For example, each NW operation state may represent a light/mid/heavy NW energy saving (ES) mode by the NW using different ES methods and parameter configurations. A serving gNB can provide to a UE parameters for each index of a NW operation state and corresponding values for the parameters in a system information block (SIB) or via UE-specific higher layer signaling. A UE can then identify a NW operation state based on an indicated value of the NW operation state index.

In one embodiment, the NW indicates to a UE a set of multiple NW operation states that can include a default state. A NW operation state can include parameters associated with transmission/reception by the network in one or more of a power, spatial, time, or frequency domain and corresponding IEs.

For example, in a power domain, a first NW operation state can be associated with a first value of parameter ss-PBCH-BlockPower providing an average energy per resource element (EPRE) with secondary synchronization signals (SSS) in dBm, and a second NW operation state can be associated with a second value of a parameter ss-PBCH-BlockPower. For example, first and second NW operation states can be respectively associated with first and second values of parameter powerControlOffsetSS that provides a power offset (in dB) of non-zero power (NZP) CSI-RS RE to SSS RE. For example, first and second NW operation states can be respectively associated with first and second values of parameter powerControlOffset that provides a power offset (in dB) of PDSCH RE to NZP CSI-RS RE.

For example, in a frequency domain, first and second NW operation states can be respectively associated with first and second values of a parameter locationAndBandwidth that indicates a frequency domain location and a bandwidth for receptions or transmissions by UEs. For example, first and second NW operation states can be respectively associated with first and second values of a list of serving cells for active transmission and reception.

For example, in a spatial domain, first and second NW operation states can be respectively associated with first and second values of a parameter maxMIMO-Layers that indicates a maximum number of MIMO layers to be used for PDSCH receptions by a UE in the associated active DL BWP, or with first and second values of a parameter nrOfAntennaPorts that indicates a number of antenna ports to be used for codebook determination for PDSCH receptions, or with first and second values of a parameter activeCoresetPoolIndex that coresetPoolIndex values for PDCCH transmissions in corresponding CORESETs and UEs can skip PDCCH receptions in a CORESET with coresetPoolIndex value that is not indicated by activeCoresetPoolIndex. For example, first and second NW operation states can be respectively associated with first and second values of an antenna port subset that indicates a list of active antenna ports for CSI calculation and other associated parameters such as codebook subset restriction, rank restriction, the logical antenna size in two-dimension, number of antenna ports, and a list of CSI-RS resources, etc.

For example, in a time domain, first and second NW operation states can be respectively associated with first and second values of a parameter ssb-PeriodicityServingCell that indicates a transmission periodicity in milliseconds for SS/PBCH blocks, or with first and second values of a parameter ssb-PositionsInBurst that indicates time domain positions of SS/PBCH blocks in a SS/PBCH block transmission burst, or with first and second values of a parameter groupPresence that indicates groups of SS/PBCH blocks, such as groups of four SS/PBCH blocks with consecutive indexes, that are transmitted. For example, first and second NW operation states can be respectively associated with first and second values of a time pattern, e.g., in terms of periodicity, on-duration, start offset, etc., that indicates cell discontinuous transmission (DTX) or cell discontinuous reception (DRX).

A serving gNB can provide a UE one or more search space sets to monitor PDCCH for detection of a DCI format 2_8 that indicates NW operation states as described in the subsequent embodiments of the disclosure. The search space sets can be separate from other search space sets that the serving gNB provides to the UE or some or all search space sets can be common and the UE can monitor PDCCH for the detection of both the DCI format 2_8 that indicates NW operation states and for other DCI formats providing information for scheduling PDSCH receptions or PUSCH transmissions or SRS transmissions, or providing other control information for the UE to adjust parameters related to transmissions or receptions.

The search space sets can be CSS sets or USS sets. When the search space sets are CSS sets, a serving gNB can indicate the search space sets associated with DCI format 2_8 through higher layer signaling in a SIB or through UE-specific RRC signaling. A UE can monitor PDCCH for detection of DCI format 2_8 both in the RRC_CONNECTED state and in the RRC_INACTIVE state according to the corresponding search space sets and DRX operation may not apply for PDCCH receptions that provide DCI format 2_8.

A UE can receive PDCCHs providing DCI format 2_8 in an active DL BWP. Alternatively, a UE can receive PDCCHs providing DCI format 2_8 in an initial DL BWP that was used by all UEs to perform initial access and establish RRC connection with a serving gNB. The latter option enables a single PDCCH transmission with DCI format 2_8 from the serving gNB to all UEs because the initial DL BWP is common to all UEs, while the former option avoids a BWP switching delay because a UE receives PDCCHs providing DCI format 2_8 in the active DL BWP. It is also possible that the serving gNB indicates the DL BWP for PDCCH receptions that provide DCI format 2_8 through higher layer signaling, for example in a SIB.

Figure 7:
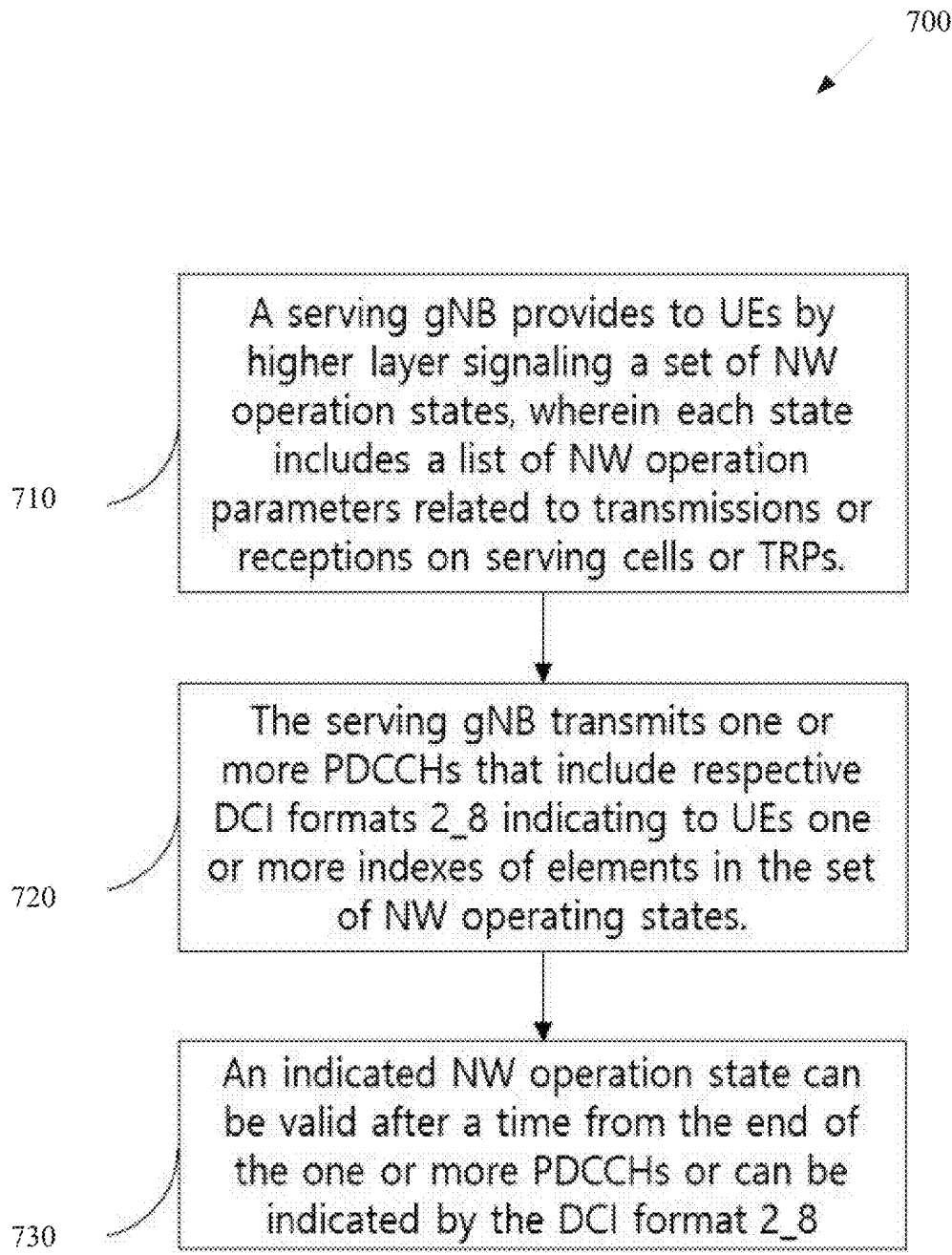
FIG. 7 illustrates a flowchart of method for a base station to indicate and activate NW operation states according to embodiments of the present disclosure.

FIG. 7 illustrates a flowchart of method 700 for a base station to indicate and activate NW operation states according to embodiments of the present disclosure. The method 700 as may be performed by a base station (e.g., 101-103 as illustrated in FIG. 1). An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

FIG. 7 illustrates an example procedure for a serving gNB to indicate to UE a NW operation state according to the disclosure.

A serving gNB provides to UEs by higher layer signaling a set of NW operation states, wherein each state includes a list of NW operation parameters related to transmissions or receptions on serving cells for example in one or more of time, frequency, spatial, or power domains 710. The higher layer signaling can be via a SIB and provided, for example, by ServingCellConfigCommonSIB, or can be UE-specific RRC signaling and provided, for example, by ServingCellConfigCommon. The serving gNB transmits one or more PDCCHs that include respective DCI formats 2_8 indicating to UEs one or more indexes of elements in the set of NW operating states 720. An indicated NW operation state can be valid after a time from the end of the one or more PDCCHs that can be predefined in the specifications of the system operation or can be indicated by the DCI format 2_8 730.

The serving gNB can also provide to UEs by higher layer signaling a set of one or more timer values. The timer values can be in absolute time, such as milliseconds, or in a number of symbols, slots, or subframes based on a numerology/SCS of the active DL BWP or of a reference DL BWP, such as the initial DL BWP, on the primary cell or based on a reference numerology/SCS. If the set includes more than one timer values, the DCI format 2_8 can also indicate a timer value. After the timer expires before the serving gNB transmits another PDCCH with DCI format 2_8 to indicate another NW operation state, the NW operation state becomes a default one that can be provided by higher layer signaling, or becomes a predetermined state from the set of NW operation states such as the first state or the last state.

Figure 8:
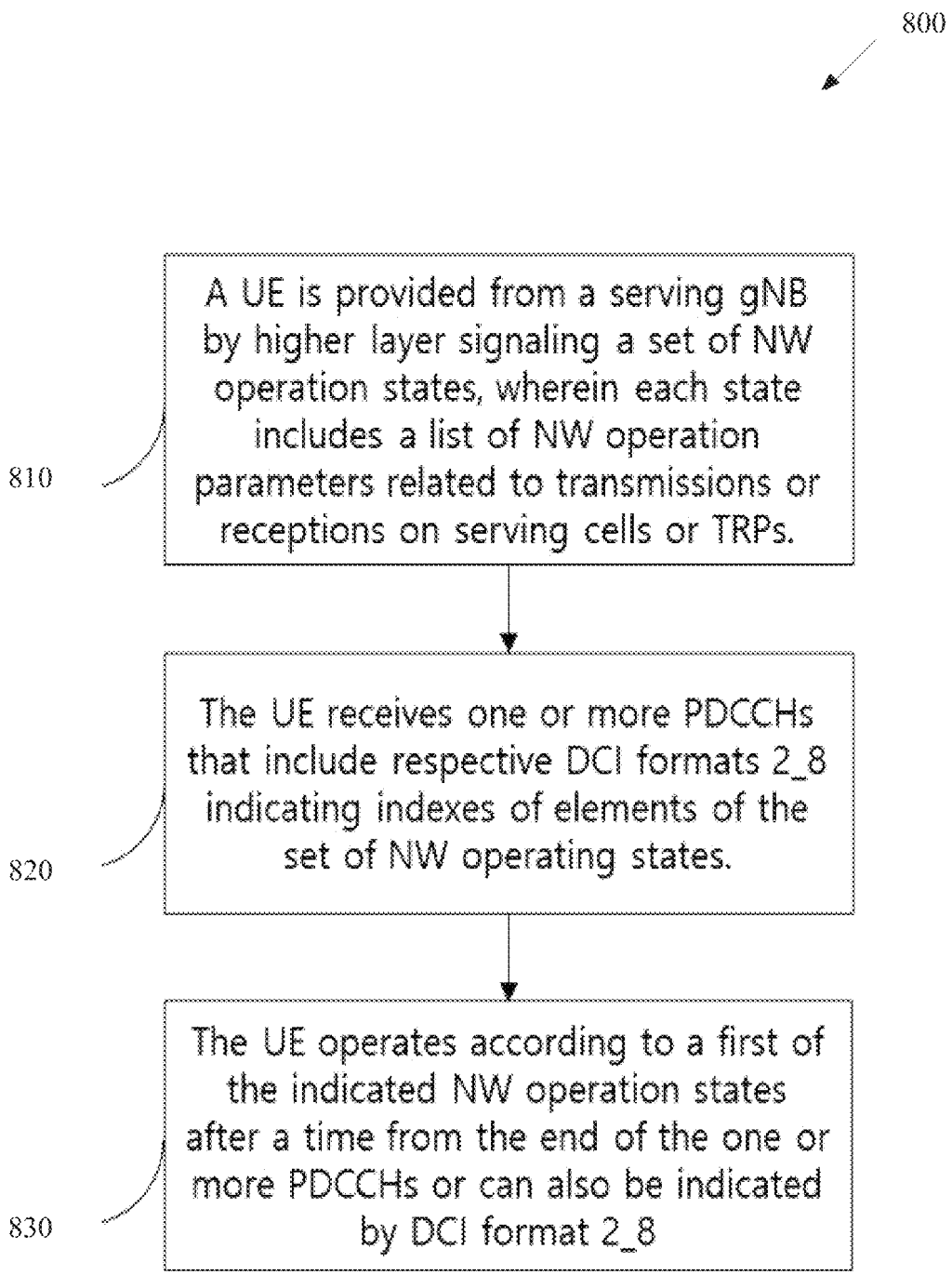
FIG. 8 illustrates a flowchart of method for UE to receive and activate NW operation states according to embodiments of the present disclosure.

FIG. 8 illustrates a flowchart of method 800 for UE to receive and activate NW operation states according to embodiments of the present disclosure. The method 800 as may be performed by a UE (e.g., 111-116 as illustrated in FIG. 1). An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

FIG. 8 illustrates an example procedure for a UE to obtain an indication of NW operation states from a DCI format according to the disclosure.

A UE is provided from a serving gNB by higher layer signaling a set of NW operation states, wherein each state includes a list of NW operation parameters related to transmissions or receptions on serving cells or TRPs for example in one or more of time, frequency, spatial, or power domains 810. The higher layer signaling can be a SIB and be provided, for example, by ServingCellConfigCommonSIB, or can be UE-specific RRC signaling and be provided, for example, by ServingCellConfigCommon. The UE receives one or more PDCCHs that include respective DCI formats 2_8 indicating indexes of elements of the set of NW operating states 820. The UE operates according to a first of the indicated NW operation states after a time from the end of the one or more PDCCHs that can be predefined in the specifications of the system operation or can also be indicated by DCI format 2_8 830.

The UE can also be provided by higher layer signaling from the serving gNB a set of one or more timer values that can be in absolute time, such as milliseconds, or in a number of symbols, slots, or subframes based on a numerology/SCS of the active DL BWP or of a reference DL BWP such as the initial DL BWP, on the primary cell, or based on a reference numerology/SCS such as 15 kHz. If the set of timer values includes more than one timer value, the DCI format 2_8 can also indicate the timer value. If the UE does not receive another PDCCH with DCI format 2_8 that indicates another NW operation state and the timer expires, the UE can assume operation according to a NW operation state that can be a default one that is provided by higher layer signaling, or can be a predetermined state from the set of NW operation states such as the first state or the last state.

An availability of bits in DCI format 2_8 can also be utilized for indicating a series of one or more NW operation states for each cell from a set of cells, or for each TRP of each cell from the set of cells. The set of cells can be restricted to include cells in a same cell group (CG) or can include cells from different CGs when, for example, PDCCHs providing DCI format 2_8 are transmitted only on a master cell group (MCG) and an indication for NW operation states can also be provided for cells of a secondary cell group (SCG). To enable such indication by a DCI format 2_8 that is provided by PDCCH receptions according to CSS sets, all UEs receiving PDCCHs that provide DCI format 2_8 need to have a same understanding for the contents of DCI format 2_8 when different UEs can be communicating with a serving gNB over a different number of cells, including over one cell, that have different indexes among UEs since cell indexes are UE-specific.

For example, a first UE can have as a primary cell (PCell), having cell index 0, a first cell while a second UE can have as a PCell a second cell. For example, third and fourth UEs can have a same PCell while the third UE communicates with a serving gNB using a first secondary cell (SCell), having cell index 1 for the third UE, and the fourth UE also communicates with a serving gNB using a second SCell that is different from the first SCell and also has cell index 1 for the fourth UE. When a UE both transmits (UL cell) and receives (DL cell) on a cell, the UL cell has a same index as the DL cell. Therefore, when a DCI format 2_8 indicates NW operation states for a cell with index 0 or for a cell with index 1, those cells are not same for the first and second UEs and the third and fourth UEs in the above examples and a corresponding ambiguity between a cell index indicated by DCI format 2_8 and an index of a cell in CA operation needs to be resolved.

One approach to enable DCI format 2_8 to indicate NW operation states for cells that have different indexes among UEs in a group of UEs that receive DCI format 2_8 is for a serving gNB to indicate to each UE from the group of UEs a location in DCI format 2_8 for a field corresponding to a cell for each of the configured cells to the UE. The serving gNB can provide the indication by higher layer signaling, for example together with the other indications related to UE procedures for monitoring PDCCH for detection of DCI format 2_8 and for the NW operation states indicated by fields of DCI format 2_8. For example, for a total of $M_{max}$ fields for indicating NW operation states, higher layer signaling can indicate a mapping between a cell for CA operation and a field indicating a NW operation state for the cell using $\log_2(M_{max})$ bits and a UE can be indicated a location of fields for all $N_{cells}$ by a total of $N_{cells} \times \log_2(M_{max})$ bits of higher layer signaling, such as UE-specific RRC signaling, for all configured cells. For example, for $M_{max}=4$ and $N_{cells}=2$, higher layers using 2 bits can indicate to a UE that the first and fourth fields in DCI format 2_8 are associated with cells with index 0 and index 1, respectively.

Other approaches can also apply to achieve the objective for linking a UE-specific cell index with a location of a field in a DCI format 2_8 that indicates NW operation states for the cell having the index when DCI format 28 is provided by a PDCCH according to a CSS set and can therefore be common to a group of UEs. For example, a separate index can be provided to each UE for each cell from the cells with corresponding fields in DCI format 2_8 and the fields in DCI format 2_8 can be arranged in ascending order of that separate index. Regardless of the approach, a UE needs to be indicated an association among indexes of configured cells for the UE and fields in DCI format 2_8 indicating NW operation states or additional parameters, such as timers (NW operation state validity duration), for the configured cells.

A UE can also be indicated by a serving gNB to monitor PDCCH for detection of multiple DCI formats 2_8 that indicate NW operation states for multiple cells when all NW indication states for all cells operated by a NW cannot be indicated by a single DCI format 2_8. The multiple DCI formats 2_8 can be associated with same or different CSS sets. Corresponding PDCCH receptions can be in same cell or in different cells, or in same CORESET or in different CORESETs. At least when the PDCCH receptions are in a same cell and in CCEs that can be overlapping, multiple DCI formats 2_8 can be differentiated based on a flag in each DCI format 2_8 that indicates a cell sub-group addressed by the corresponding DCI format 2_8, or based on using different RNTIs corresponding with different cell sub-groups for scrambling the CRC bits of DCI format 2_8, where the cells in each of the cell sub-groups can be indicated to a UE by higher layers.

DCI format 2_8 can also indicate a NW operation state for TRPs per cell. For a total of 2 TRPs per cell, a field in DCI format 2_8 can indicate a NW operation state for a corresponding TRP where, for example, for a given cell the field for the second TRP can be consecutive to the field for the first TRP. The TRP index can be same for all UEs configured for M-TRP operation on a cell and, unlike the UE-specific cell index, a separate indication for an association of a field in DCI format 2_8 with a TRP index, in addition to the association/link with the cell index, is not necessary and can be avoided. Otherwise, if a TRP index is not common for all UEs configured for M-TRP operation and is instead UE-specific, each TRP can be treated as a virtual cell and a same approach as for linking a UE-specific cell index with a field in DCI format 2_8 indicating a respective NW operation state can apply. The indication of a link between a cell index and a field in DCI format 2_8 also allows some cells to support M-TRP operation and for that operation to be UE-specific. A UE that is not configured for M-TRP operation on a cell can be indicated by UE-specific RRC signaling only one of the two fields corresponding to two TRPs for the cell and can then determine a NW adaptation state for the cell according to a value of the indicated one field.

To reduce a signaling overhead for DCI format 2_8, a same NW indication state can apply to a subset of cells and DCI format 2_8 can provide indications per subset of cells instead of per cell. For example, such indication can be applicable when a NW transitions operation states per subset of cells instead of per individual cell. To support that functionality, a field in DCI format 2_8 can be associated with a subset of cells. A UE can be informed of a link between the field in DCI format 2_8 and the subset of cells as previously described for a link between a field in DCI format 2_8 and a cell. The UE can be informed by higher layer signaling, such as UE-specific RRC signaling, of configured cells that belong to a subset of cells.

Figure 9:
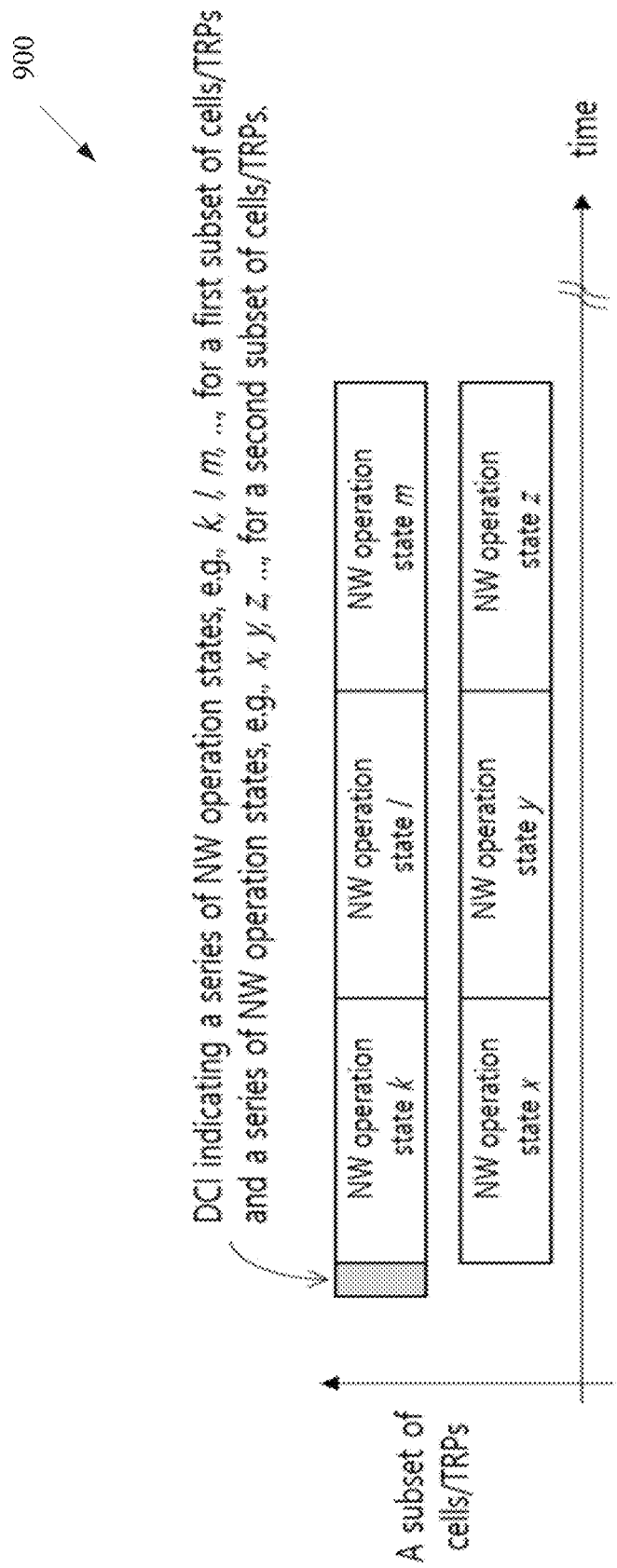
FIG. 9 illustrates example of timing diagram of NW operation state transition according to this disclosure.

FIG. 9 illustrates example of timing diagram of NW operation state transition 900 according to this disclosure. An embodiment of the timing diagram of NW operation state transition 900 shown in FIG. 9 is for illustration only.

Figure 10:
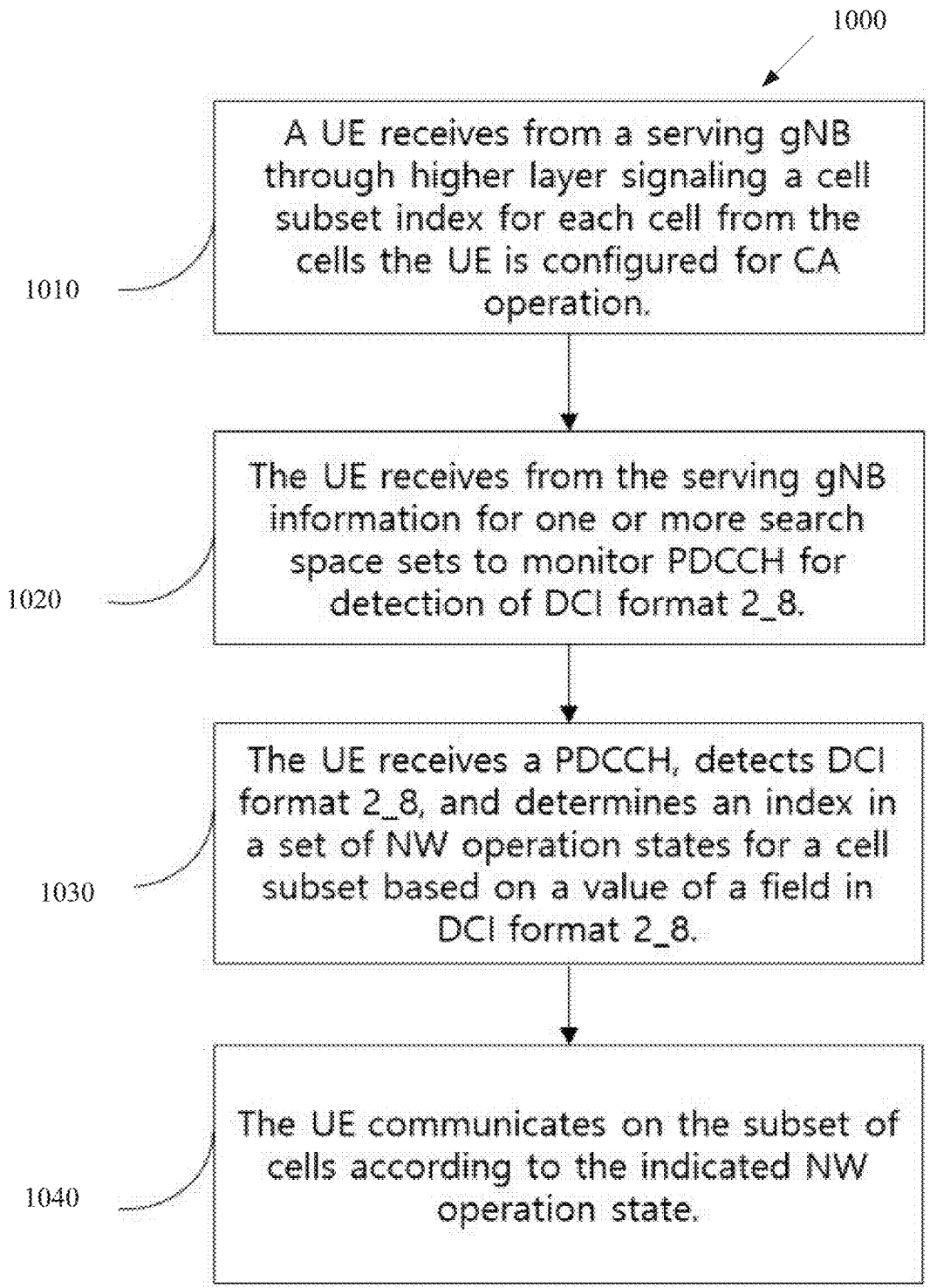
FIG. 10 illustrates a flowchart of UE method for DCI format indicating NW operation states for multiple cells/transmit receive points (TRPs) according to embodiments of the present disclosure.

FIG. 10 illustrates a flowchart of UE method 1000 for DCI format indicating NW operation states for multiple cells/TRPs according to embodiments of the present disclosure. The method 1000 as may be performed by a UE (e.g., 111-116 as illustrated in FIG. 1). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

FIGS. 9 and 10 illustrate a DCI format indicating NW operation states for multiple cells/TRPs.

FIG. 10 illustrates a NW operation state transition via a DCI format indicating a group of NW operation states for a number of cells or TRPs per cell according to the present disclosure.

As illustrated in FIG. 10, a UE is indicated a number of subsets of cells or TRPs, where each subset includes one or more cells or TRPs, that have a same indication by DCI format 2_8 apply for a NW operation state 1010. A first state indication in DCI format 2_8 applies to a first subset of cells or TRPs, a second state indication applies to a second subset of cells or TRPs, and so on. For X subsets of cells/TRPs with NW operation state indicated by a DCI format 2_8 and a set of N NW operation states, DCI format 2_8 includes X*ceil($\log_2(N)$) bits. For indicating a series of M state indexes for each subset of cells/TRPs, DCI format 2_X includes X*M*ceil($\log_2(N)$) bits. If a time duration value, from a set of L time duration values, for a validity of each state is also indicated by DCI format 2_8, an additional M*ceil($\log_2(L)$) bits are included in DCI format 2_8.

A UE receives from a serving gNB through higher layer signaling, such as UE-specific RRC signaling, a cell subset index for each cell from the cells the UE is configured for CA operation 1010. A cell subset can include one cell or, if a cell subset index is not provided for a cell, a NW operation state is separately indicated for the cell by DCI format 2_8. The UE also receives from the serving gNB information for one or more search space sets, such as CSS sets, to monitor PDCCH for detection of DCI format 2_8 1020. The CORESETs associated with the search space sets can be on a same cell or in different cells. For a UE configured for M-TRP operation on a cell of the PDCCH receptions, the CORESETs can be associated only with coresetPoolIndex value of 0 or with CORESETs that are not provided a coresetPoolIndex value, or can also be associated with coresetPoolIndex value of 1.

The UE receives a PDCCH, detects (correctly decodes) DCI format 2_8, and determines an index in a set of NW operation states for a cell subset based on a value of a field in DCI format 2_8 1030. The set of NW operation states is separately provided to the UE by higher layer signaling, such as in a SIB or by UE-specific RRC signaling. If the UE is also provided a set of time duration (timer) values and DCI format 2_8 includes a field providing an index to the set of time duration values that is linked to the field providing an index to the set of NW operation states for the subset of cells, the UE determines a time duration value for the NW operation state. The UE communicates on the subset of cells according to the indicated NW operation state 1040.

The UE can assume that the indicated NW operation state becomes applicable after a predetermined or indicated time, for example by higher layers or by DCI format 2_8, from the end of the PDCCH reception providing DCI format 2_8 in order to provide a required time for the UE and the serving gNB to change respective signaling configurations to the ones of indicated NW operation state.

It is generally beneficial that a size of DCI format 2_8 is small because a corresponding decoding reliability needs to be large. UEs that fail to detect a DCI format 28 may not operate under a correct configuration for communicating with a serving gNB and that can result to poor quality of serving and create problems to the overall network operation.

As DCI format 2_8 needs to be provided to all UEs communicating with a serving gNB, it is appropriate for PDCCH monitoring for detection of DCI format 2_8 to be according to one or more CSS sets and for a CRC of DCI format 2_8 to be scrambled by a dedicated RNTI such as a NW operation state RNTI (NOS-RNTI). Sizes for other DCI formats that UEs can be configured to monitor according to CSS sets, such as for example a DCI format 2_0 used for indicating an adaptation to UL/DL symbols of a slot over a number of slots and to possibly provide other functionalities as described in TS 38.213, can be different, and typically larger, than the size of DCI format 2_8. Therefore, a UE design constraint for maintaining a "3+1" limit for sizes of DCI formats that the UE can decode from PDCCH receptions per cell needs to be addressed when the UE also decodes DCI format 2_8 for PDCCH receptions on a cell.

In one example, a size of DCI format 2_8 can be separate, for example smaller, from sizes of other DCI formats that a UE monitors corresponding PDCCHs on a same cell. Then, in order to maintain a "3+1" limit for sizes of DCI formats for the cell, a UE may need to perform additional size matching for DCI formats the UE receives corresponding PDCCHs for the cell where the UE receives PDCCHs that provide DCI format 2_8. That would lead to increased size for some of the DCI formats as size matching between two DCI formats is by padding zeroes to one of the DCI formats that has smaller size.

In one example, to avoid a potential increase for sizes of other DCI formats, a size of DCI format 2_8 can be defined by the specifications of the system operation to be same as a size of DCI format 1_0 that is provided by PDCCH receptions according to CSS sets in the active DL BWP of a UE, or in the initial DL BWP if PDCCH receptions providing DCI format 2_8 are only in the initial DL BWP, and needs to be received by all UEs communicating with a serving gNB.

For example, DCI format 1_0 can be used to schedule PDSCH providing SIBs, or random access response, or paging, or, when the CRC is scrambled by a C-RNTI, schedule UE-specific PDSCH. For example, for a typical DCI format 1_0 size of about 40 bits, excluding CRC, a serving gNB can indicate a size of the fields, for example by configuring a set of values to be indicated by each field as previously described, and if the total size of DCI format 2_8 is smaller than the size of DCI format 1_0, the UE can pad bits to DCI format 2_8, such as bits with value of 0, until a size of DCI format 2_8 is same as a size of DCI format 10 provided by PDCCHs that the UE monitors according to CSS sets. The additional padding for DCI format 2_8 is not material as a resulting size is same as a size of a DCI format, that is DCI format 1_0 that the UE monitors PDCCH in CSS sets, that is used to provide cell coverage.

In one example, instead of being specified to be same a size of DCI format 10 provided by PDCCHs that a UE monitors according to CSS sets, a size of DCI format 2_8 can be separately indicated to a UE by a serving gNB through higher layer signaling, such as through a SIB or through UE-specific RRC signaling. The third approach provides flexibility to a serving gNB compared to the second approach at the expense of marginal signaling overhead. For example, if sizes of other DCI formats that a UE monitors corresponding PDCCHs according to CSS sets are smaller than a size of DCI format 1_0 that the UE monitors corresponding PDCCHs according to CSS sets, the serving gNB can indicate one of the size of the other DCI formats.

For example, if search space sets indicated to all UE by the serving gNB are such that associated sizes of DCI formats are less than the "3+1" limit, DCI format 2_8 can have any size without requiring size matching for the other DCI formats by any UE. The indication of the size of DCI format 2_8 can be optional. If provided, a UE appends zeroes to the bits of the fields in DCI format 2_8 until a size is same as the indicated size. If not provided, a UE determines a size of DCI format 2_8 based on a total number of bits for the fields of DCI format 2_8.

In addition to providing an indication of a NW operation state by a DCI format 2_8 that is associated with CSS sets, an indication of a NW operation state can also be provided by a DCI format with CRC scrambled by one or more of a C-RNTI/CS-RNTI/MCS-C-RNTI. Then, a serving gNB can individually inform UEs of a NW operation state. That can be beneficial when there are few UEs in the network, or when a serving gNB determines that a UE did not correctly receive DCI format 2_8 in a previous PDCCH transmission, for example because the UE connected with the serving gNB based on a previous NW operation state and there was not enough time for the UE to monitor PDCCH for detection of DCI format 28 particularly when a PDCCH monitoring periodicity for detection of DCI format 2_8 is relatively large since a serving gNB may not frequently adapt a NW operation state.

A DCI format used for scheduling PDSCH receptions or PUSCH transmissions can be reinterpreted as indicating a NW operation state based on the specifications of the system operation. The reinterpretation can be based when the specified fields of the DCI format have specified values. For example, a frequency domain resource allocation (FDRA) field can be specified to have all-zeros values for example for FDRA Type-0 as defined in TS 38.212 or all-ones values for example for FDRA Type-1 as defined in TS 38.212, and the modulation and coding scheme (MCS) field can be specified to have all-zeroes values or all-ones values and the UE can reinterpret remaining bits of a DCI format as providing fields for indication of a NW operation state and possibly additional information as described in the previous embodiments.

For example, a time-domain resource allocation (TDRA) field can be specified to have all-zeros values and the MCS field can be specified to have all-ones values and the UE can reinterpret remaining bits of a DCI format as providing fields for indication of a NW operation state and possibly additional information as described in the previous embodiments. In general, a specified combination of values for some fields in a DCI format can have specified values and then the UE can reinterpret remaining bits of the DCI format, except for the CRC bits, as providing fields for indication of a NW operation state and possibly additional information as described in the previous embodiments. The DCI format can be any DCI format or the reinterpretation of a DCI format for indicating a NW operation state can be restricted to one or more specified DCI formats such as DCI format 0_1 or DCI format 1_1 or DCI format 0_0 or DCI format 1_0, and so on.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for a user equipment (UE), the method comprising:
   receiving first information related to a list of parameters in one or more of power, spatial, time, or frequency domains, wherein:
      the list includes a number of sets of parameters corresponding to a first number of cells, and
      the sets of parameters are associated with transmission of channels or signals from a base station;
   receiving second information for a search space set for reception of physical downlink control channels (PDCCHs);
   receiving a PDCCH from the PDCCHs, wherein:
      the PDCCH provides a downlink control information (DCI) format that indicates a number of indexes,
      an index from the number of indexes is associated with a second number of cells from the first number of cells, and
      the index corresponds to a set of parameters from the number of sets of parameters that corresponds to the second number of cells;
   determining parameters on a cell from the second number of cells based on the index; and
   receiving a channel or signal on the cell based on the parameters.

2. The method of claim 1, wherein the parameters include at least one of:
   a power,
   a number of antenna ports or a maximum number of spatial multiplexing layers,
   a frequency range, and
   a time pattern.

3. The method of claim 1, further comprising:
   receiving third information mapping the second number of cells to the index; and
   receiving fourth information related to a location of each index, from the second number of indexes, in the DCI format.

4. The method of claim 1, wherein the reception of the PDCCH is:
   in RRC_CONNECTED and RRC_INACTIVE states, and
   in discontinuous reception (DRX) on-duration and out of DRX on-duration.

5. The method of claim 1, further comprising:
   receiving third information related to a size of the DCI format.

6. The method of claim 1, wherein the reception of the PDCCHs is according to a common search space.

7. The method of claim 1, wherein:
   the reception of the PDCCHs is according to a UE-specific search space,
   when predetermined bits of the DCI format have predetermined values, the DCI format indicates the number of indexes, and
   when the predetermined bits of the DCI format do not have the predetermined values, the DCI format schedules a reception of a physical downlink shared channel (PDSCH) or a transmission of a physical uplink shared channel (PUSCH).

8. A user equipment (UE) comprising:
   a transceiver configured to receive:
      first information related to a list of parameters in one or more of power, spatial, time, or frequency domains, wherein:
         the list includes a number of sets of parameters corresponding to a first number of cells, and
         the sets of parameters are associated with transmission of channels or signals from a base station;
      second information for a search space set for reception of physical downlink control channel (PDCCHs); and
      a PDCCH from the PDCCHs, wherein:
         the PDCCH provides a downlink control information (DCI) format that indicates a number of indexes,
         an index from the number of indexes is associated with a second number of cells from the first number of cells, and
         the index corresponds to a set of parameters from the number of sets of parameters; and
   a processor operably coupled to the transceiver, the processor configured to determine parameters for receptions on a cell from the second number of cells based on the index,
   wherein the transceiver is further configured to receive a channel or signal on the cell based on the parameters.

9. The UE of claim 8, wherein the parameters include at least one of:
   a power,
   a number of antenna ports or a maximum number of spatial multiplexing layers,
   a frequency range, and
   a time pattern.

10. The UE of claim 8, wherein the transceiver is further configured to receive:
    third information mapping the second number of cells to the index; and
    fourth information related to a location of each index, from the number of indexes, in the DCI format.

11. The UE of claim 8, wherein the transceiver is further configured to receive the PDCCH:
    in RRC_CONNECTED and RRC_INACTIVE states; and
    in discontinuous reception (DRX) on-duration and out of DRX on-duration.

12. The UE of claim 8, wherein the transceiver is further configured to receive third information related to a size of the DCI format.

13. The UE of claim 8, wherein the reception of the PDCCH is according to a common search space.

14. The UE of claim 8, wherein:
the reception of the PDCCH is according to a UE-specific search space,
when predetermined bits of the DCI format have predetermined values, the DCI format indicates the number of indexes, and
when the predetermined bits of the DCI format do not have the predetermined values, the DCI format schedules a reception of a physical downlink shared channel (PDSCH) or a transmission of a physical uplink shared channel (PUSCH).

15. A base station comprising:
a transceiver configured to transmit:
first information related to a list of parameters in one or more of power, spatial, time, or frequency domains, wherein:
the list includes a number of sets of parameters corresponding to a first number of cells, and
the sets of parameters are associated with transmission of channels or signals from the base station;
second information for a search space set for transmission of physical downlink control channels (PDCCHs); and
a PDCCH from the PDCCHs, wherein:
the PDCCH provides a downlink control information (DCI) format that indicates a number of indexes,
an index from the number of indexes is associated with a second number of cells from the first number of cells, and
the index corresponds to a set of parameters from the number of sets of parameters that corresponds to the second number of cells; and
a processor operably coupled to the transceiver, the processor configured to determine parameters for transmissions on a cell from the second number of cells based on the index,
wherein the transceiver is further configured to transmit a channel or a signal on the cell based on the parameters.

16. The base station of claim 15, wherein the parameters include at least one of:
a power,
a number of antenna ports, or a maximum number of spatial multiplexing layers,
a frequency range, and
a time pattern.

17. The base station of claim 15, wherein the transceiver is further configured to transmit:
third information mapping the second number of cells to the index; and
fourth information related to a location of each index, from the second number of indexes, in the DCI format.

18. The base station of claim 15, wherein the transceiver is further configured to transmit the PDCCH:
in RRC_CONNECTED and RRC_INACTIVE states; and
in discontinuous reception (DRX) on-duration and out of DRX on-duration.

19. The base station of claim 15, wherein the transceiver is further configured to transmit third information related to a size of the DCI format.

20. The base station of claim 15, wherein:
the transceiver is further configured to transmit the PDCCH in a UE-specific search space,
when predetermined bits of the DCI format have predetermined values, the DCI format indicates the number of indexes, and
when the predetermined bits of the DCI format do not have the predetermined values, the DCI format schedules a transmission of a physical downlink shared channel (PDSCH) or a reception of a physical uplink shared channel (PUSCH).

\* \* \* \* \*